UNITED STATES PATENT OFFICE 1,963,136

MANUFACTURE OF HYDROXYLATED DERIVATIVES OF THE ANTHRAQUINONE SERIES

Ernest William Kirk, Henry Charles Olpin, and George Holland Ellis, Spondon, near Derby, England, assignors to Celanese Corporation of America, a corporation of Delaware No Drawing. Application October 30, 1930, Serial No. 492,360. In Great Britain January 8, 1930

6 Claims. (Cl. 260—58)

This invention relates to the manufacture of hydroxylated derivatives of the anthraquinone series.

It is known that hydroxyl groups may be introduced into the nucleus of anthraquinone or of its derivatives by the action of nitrosyl sulphuric acid in the presence of mercury or mercury compounds, preferably in the presence also of boric acid, arsenic acid, phosphoric acid or the like. In this manner, quinizarin may be obtained from anthraquinone, quinizarin carboxylic acid from 2-methyl-anthraquinone, 5-nitro-quinizarin from 1:5-dinitro-anthraquinone, 1:4:5-trioxy-anthraquinone from chrysazin, and a purpurin sulphonic acid from anthraquinone-2-sulphonic acid.

This method of introducing hydroxyl groups into the nucleus of anthraquinone or of its derivatives is attended by the disadvantage that the reaction is frequently undesirably violent and difficult to control. In the case of the production of quinizarin from anthraquinone for instance, the reaction mixture prepared from sulphuric acid, anthraquinone, nitrosyl sulphuric acid, and mercurous sulphate frequently froths violently at temperatures over 160° C., while if lower temperatures are employed the formation of quinizarin may be so incomplete or so slow as to render the process impracticable commercially.

We have now found that in the aforesaid process of introducing hydroxyl groups into the anthraquinone nucleus, the proportion of mercury or mercury compound has an important influence on the course of the reaction and that the latter may be prevented from becoming uncontrollably violent at any stage, if the proportion of mercury or mercury compound is considerably less than has usually been employed. In the past 230 parts of mercurous sulphate has been suggested for use with 1000 parts of anthraquinone in the preparation of quinizarin. While with this proportion the reaction may perhaps be effected satisfactorily on a small experimental scale its violence and difficulty of control render it quite unsuited to commercial scale working. We have found that a small fraction of the aforesaid proportion of mercury compound is sufficient to enable the reaction to be effected satisfactorily, and yet kept under adequate control.

In accordance with the present invention, therefore, the introduction of hydroxyl groups into the nucleus of anthraquinone or of its derivatives by means of nitrosyl sulphuric acid is effected in the presence of mercury either as such or in the form of mercury compounds, in proportion so limited that the reaction does not become undesirably or uncontrollably violent.

The proportion of mercury or mercury compound employed may vary according to the particular compound to be oxidized and according to the proportion of sulphuric acid simultaneously present. A proportion of from 0.5 to 4 parts of mercury per 1000 parts of anthraquinone compound has been found in general to lead to highly satisfactory results. For instance, in the case of the production of quinizarin from anthraquinone the reaction may be effected at a satisfactory speed, but without becoming unduly violent, when mercury is employed in the proportion of 1 to 3 parts, for example 2 parts, per 1000 parts of anthraquinone, the latter being in solution in from 10 to 30 times its weight of concentrated sulphuric acid. The proportion of mercury should not be so small as to cause the reaction to take place too sluggishly for commercial requirements.

In carrying the invention into effect the treatment of the anthraquinone compounds with nitrosyl sulphuric acid in the presence of limited quantities of mercury or mercury compound may conveniently be carried out in the presence of sulphuric acid of 60 or 66° Bé. The sulphuric acid may be employed in proportions varying within wide limits and may be for example from 10 to 40 times or more the weight of anthraquinone compound to be treated. Further, it is frequently an advantage to effect the reaction in the presence of boric acid, arsenic acid or phosphoric acid or other compounds adapted to protect hydroxyl groups during oxidation treatments of anthraquinone or its derivatives in the presence of sulphuric acid.

The nitrosyl sulphuric acid may be employed as such, for example in the form of chamber crystals, or may be prepared as required by the addition of a metallic nitrite to sulphuric acid.

The temperatures at which the reaction is effected may vary according to the nature of the materials treated and the products required. It is usually advantageous to commence the reaction at a comparatively low temperature and then to raise the temperature gradually until the evolution of gas ceases and the reaction is complete. When producing quinizarin from anthraquinone for instance, the reaction may be commenced at about 120° C. continued at 120–150° C. for a time, and finally completed at 150–180° C.

The invention is illustrated but not limited by the following examples.

Example 1

2 parts of sodium nitrite and 0.5 parts of boric acid are added to 20 parts of concentrated sulphuric acid whilst stirring well, the addition being made at such a rate that the temperature does not exceed 60° C. 0.002 parts of mercuric chloride are then finely powdered, dissolved in 0.1 parts of sulphuric acid and the solution added to the main bulk of sulphuric acid. 1 part of anthraquinone is then added and the whole heated while stirring well to 130° C. which temperature is maintained for 3 hours. The temperature is then raised slowly to 160° C. maintained at 160–165° for a further 3 hours and finally held at 170–175° C. for 4 hours more. The reaction mixture is then cooled, poured into 16 parts of water and boiled for ¼ hour. The precipitated quinizarin is then filtered off, washed and pressed.

Example 2

To 2400 parts of 96 per cent. sulphuric acid are added 48 parts of sodium nitrite, 24 parts of powdered boric acid, and 0.36 parts of yellow precipitated mercuric oxide. These additions are made during vigorous stirring.

The solution is warmed to 60° C., at which temperature 120 parts of 1:8-dihydroxy anthraquinone are introduced. The temperature is slowly raised in the first place to 120–130° C., and after one hour thereat the melt is heated for a period of eight hours, at 170–180° C. The colour of the solution has now changed from the initial red colour and has gradually become a bright bluish violet. After cooling, the solution is poured into twenty times its volume of water, and the resulting suspension is boiled for a short while. The suspension is then filtered, and the residue, consisting of 1:4:5-trihydroxy-anthraquinone, is washed till free from acid, and dried.

The new process of oxidizing anthraquinone compounds with nitrosyl sulphuric acid in the presence of limited quantities of mercury or mercury compounds is likewise applicable in the manufacture of other hydroxylated derivatives of anthraquinone from compounds containing fewer or no hydroxyl groups. In some cases other reactions may take place simultaneously. For example in the case of treating 2-methylanthraquinone the methyl group may become oxidized to a carboxyl group with formation of quinizarin carboxylic acid.

What we claim and desire to secure by Letters Patent is:—

1. Process for introducing hydroxyl groups into the nucleus of anthraquinone compounds by the action of nitrosyl sulphuric acid in the presence of mercury, wherein the mercury is employed in the proportion of 0.5 to 4 parts per 1000 parts of anthraquinone compound.

2. Process for introducing hydroxyl groups into the nucleus of anthraquinone compounds by the action of nitrosyl sulphuric acid, which comprises carrying out the reaction in the presence of 0.5 to 4 parts of mercury per 1000 parts of anthraquinone compound, and in the presence of a substance selected from the group consisting of boric acid, arsenic acid, and phosphoric acid.

3. Process for the production of quinizarin by acting on anthraquinone with nitrosyl sulphuric acid in the presence of mercury, the mercury employed being in the proportion of 0.5 to 4 parts per 1000 parts of anthraquinone.

4. Process for the production of quinizarin by acting on anthraquinone with nitrosyl sulphuric acid, which comprises carrying out the reaction in the presence of 0.5 to 4 parts of mercury per 1000 parts of anthraquinone and in the presence of 10,000 to 30,000 parts of sulphuric acid per 1000 parts of anthraquinone.

5. Process for the production of quinizarin by acting on anthraquinone with nitrosyl sulphuric acid, which comprises carrying out the reaction in the presence of 0.5 to 4 parts of mercury per 1000 parts of anthraquinone and in the presence of a compound selected from the group consisting of boric acid, arsenic acid and phosphoric acid.

6. Process for the production of quinizarin by acting on anthraquinone with nitrosyl sulphuric acid, which comprises carrying out the reaction in the presence of 0.5 to 4 parts of mercury per 1000 parts of anthraquinone and in the presence of 10,000 to 30,000 parts of sulphuric acid per 1000 parts of anthraquinone and in the presence of a compound selected from the group consisting of boric acid, arsenic acid and phosphoric acid.

ERNEST WILLIAM KIRK.
HENRY CHARLES OLPIN.
GEORGE HOLLAND ELLIS.